US012810633B2

(12) United States Patent
Cuiffo et al.

(10) Patent No.: US 12,810,633 B2
(45) Date of Patent: Nov. 24, 2026

(54) OPEN VOCABULARY FOOD IMAGE RECOGNITION WITH MULTIMODAL GENERATIVE MODELS

(71) Applicant: GOOGLE LLC, Mountain View, CA (US)

(72) Inventors: Eric Cuiffo, Jersey City, NJ (US); Bo Lin, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 121 days.

(21) Appl. No.: 18/897,835

(22) Filed: Sep. 26, 2024

(65) Prior Publication Data

US 2026/0087833 A1 Mar. 26, 2026

(51) Int. Cl.

*G06V 20/68* (2022.01)
*G06V 10/764* (2022.01)
*G06V 10/778* (2022.01)
*G06V 20/20* (2022.01)
*G06V 20/70* (2022.01)

(52) U.S. Cl.

CPC ............ *G06V 20/68* (2022.01); *G06V 10/764* (2022.01); *G06V 10/778* (2022.01); *G06V 20/20* (2022.01); *G06V 20/70* (2022.01); *G06V 2201/10* (2022.01)

(58) Field of Classification Search

None

See application file for complete search history.

(56) References Cited

U.S. PATENT DOCUMENTS

| | | | | |
|---|---|---|---|---|
| 11,568,760 | B1 * | 1/2023 | Meier | G06V 10/764 |
| 2016/0063734 | A1 * | 3/2016 | Divakaran | G06V 10/50 382/110 |
| 2020/0202130 | A1 * | 6/2020 | Nowak-Przygodzki | G06F 3/011 |
| 2021/0027485 | A1 * | 1/2021 | Zhang | G06Q 10/063114 |
| 2024/0071598 | A1 * | 2/2024 | Neumann | G16H 10/20 |

FOREIGN PATENT DOCUMENTS

| | | | | |
|---|---|---|---|---|
| JP | 2025084021 A * | 6/2025 | | G06N 20/00 |
| WO | WO-2024196806 A2 * | 9/2024 | | G06Q 50/22 |

* cited by examiner

*Primary Examiner* — Bernard Krasnic
(74) *Attorney, Agent, or Firm* — Gray Ice Higdon

(57) ABSTRACT

Implementations are described herein for improving the identification of entities in image data. In various implementations, image data is received depicting one or more food items. A geolocation associated with the image data can be obtained, as well as additional contextual data about one or more of the digital images. The image data along with the additional contextual data can be assembled into an input prompt for a generative model and processed by the generative model. The output of the generative mode can include a classification of one or more of the food items present in the image data. This classification can be rendered as output at a user device.

18 Claims, 4 Drawing Sheets

OPEN VOCABULARY FOOD IMAGE RECOGNITION WITH MULTIMODAL GENERATIVE MODELS

BACKGROUND

Entity/object identification within image data can be performed using non-generative machine learning models such as convolutional neural networks. However, these types of machine learning often have outputs that are constrained to a finite vocabulary, which leads to misidentification and/or over-broad categorization. For example, a picture depicting a Hawaiian pizza may be classified too granularly, e.g., as depicting "crust," "cheese," "pineapple," and "ham," or too broadly, e.g., as depicting "pizza" or even "food." As another example, an obscure or "long-tail" dish that is not well-known may be misclassified as a more well-known dish. Moreover, these models do not take advantage of additional metadata that is typically associated with digital imagery, such as geolocations.

SUMMARY

Implementations are described herein for open vocabulary classification of food items using machine learning models. More particularly, but not exclusively, techniques described herein relate to using contextual data associated with digital images and multimodal generative models to classify food items in image data. Multimodal generative models can process an image in conjunction with additional related data, such as contextual data associated with the image and/or the context in which the image was captured or otherwise acquired. The inclusion of the contextual data as input enables generative models to generate accurate, detailed, and robust output that is not limited to a finite vocabulary, unlike many non-generative machine learning models.

Techniques described herein may give rise to various technical solutions to technical problems. Using machine learning model(s) to process image data alone, without additional context such as geolocational data, limits the ability to disambiguate between similar-appearing dishes, and/or to classify food or other entities/objects entities depicted in the image data outside of a finite vocabulary. Consequently, a relatively obscure dish may be incorrectly classified as another more well-known dish having a similar visual appearance (e.g., a cream-based pasta dish endemic to a specific region of Italy may be misclassified generically as "fettuccine alfredo"). Additionally, unseen dishes may be misclassified or classified as a list of visible ingredients. By conditioning multimodal generative models with both image (s) and additional contextual data, particularly geolocation data and/or other contextual data that can be retrieved using the geolocational data, it is possible to classify heretofore unseen dishes.

In some implementations, geolocation data incorporated into the digital image—e.g., as a geotag stored as part of the image's metadata that indicates where the image was captured—may be used to retrieve menu(s) from nearby restaurant(s). In other implementations, position coordinates and/or locations obtained by other means, such as from a user's electronic calendar (e.g., via a scheduled meeting at a restaurant or at a location near restaurant(s)), may be used. However the location is obtained, in some implementations, the closest n (positive integer) restaurants may be identified, and their menus (or dishes they prepare) may be retrieved.

Menus (or more generally, dishes prepared by restaurants) may be retrieved in various ways from various sources. In some implementations, websites associated with the restaurants may be queried or scraped to determine menus. The websites may be identified in various ways, such as by submitting queries to search engines, identifying websites via a mapping application (which often index and/or provide access to websites and other information about locations of interest), etc. Alternatively, the restaurants may be associated with food delivery and/or table reservations services, which may make restaurants' menus available via application programming interfaces (APIs) (e.g., to allow individual dishes to be ordered for takeout or delivery) and/or other similar means.

The content of these menu(s) may be assembled into an input prompt along with the digital image (and the geolocation, if desired). The input prompt may also include a request to match the dish depicted in the digital image to one or more of the dishes contained in the menu(s). This effectively provides an ad hoc vocabulary that enables the generative model to classify heretofore unseen dishes.

Techniques described herein may be performed using information other than menus published by restaurants near a geolocation associated with an image. In some implementations, other contextual signals, such as the location itself and/or other data retrieved using the location, may be retrieved and incorporated into input prompts. For example, a geolocation associated with the image may be used to identify a particular region in which the image was captured. Then, a list of dishes endemic to that region may be retrieved, e.g., by submitting a query to a search engine, by obtaining dishes from menus of some number of restaurants (randomly selected, the most popular, the highest rated, etc.) located in that region, by querying food delivery services (e.g., via APIs) operating in that region, etc. These retrieved dishes may then be used to either expand the vocabulary of the generative model, or to disambiguate between otherwise similar dishes.

For instance, without additional context, an image captured in Northern Italy that depicts Bistecca alla Fiorentina ("Florentine steak") may be classified simply as "steak" or "loin steak on the bone." By contrast, with techniques described herein, prompting the generative model with the additional context of the image's location in Northern Italy and/or the retrieved local dish name ("Bistecca alla Fiorentina") may be sufficient to condition the generative model to classify the dish more accurately as "Bistecca alla Fiorentina."

In various implementations, a method may be implemented using one or more processors and may include: receiving one or more digital images depicting one or more food items; obtaining one or more geolocations associated with one or more of the digital images; receiving additional contextual data about one or more of the digital images; assembling, as an input prompt for a generative model, data indicative of: one or more of the digital images depicting one or more food items, and the additional contextual data about one or more of the digital images; causing the input prompt to be processed using one or more generative models to generate one or more classifications of one or more of the food items, wherein the one or more classifications are conditioned on the additional contextual data; and causing one or more output devices to render output that conveys the one or more classifications.

In various implementations, the additional contextual data can include a name of a restaurant at or near one or more of the geolocations, a restaurant class or cuisine of a restaurant at or near one or more of the geolocations, one or more statements extracted from one or more user reviews of a restaurant at or near one or more of the geolocations, one or more price indicators associated with a restaurant at or near one or more of the geolocations, one or more documents one or more local dishes of a geographic region corresponding to one or more of the gcolocations, and/or one or more menus of one or more restaurants corresponding to one or more of the geolocations.

In various implementations, a plurality of menu items contained in one or more of the menus can define an ad hoc vocabulary of candidate dishes to which the one or more classifications, generated using the one or more generative models, are conditioned. The plurality of menu items contained in one or more of the menus can constrain a search space to which the one or more classifications, generated using the one or more generative models, are limited. The input prompt can be further assembled to include a command to match one or more of the food items depicted in one or more of the images with one or more menu items on one or more of the menus.

In various implementations, one or more of the generative models can include a vision language model (VLM). Alternatively and/or additionally, one or more of the generative models can include a student model that is trained using a teacher model, wherein the student model has fewer parameters than the teacher model.

Accordingly, implementations described herein can conserve computational and/or network resources when the processor(s) utilize the student model to perform the task in lieu of the teacher model. Further, and even assuming the processor(s) determine to initiate and conduct the automated telephone call, implementations described herein can conserve computational and/or network resources when the processor(s) determine a given time instance (e.g., within hours of operation of the entity) to initiate and conduct the automated telephone call to maximize the likelihood that the automated assistant will successfully perform the task. These computational and/or network resources can include, for example, telephonic network resources consumed by the processor(s) causing the automated assistant to initiate and/or conduct the automated telephone call, computational and/or network resources consumed by the processor(s) causing the automated assistant to initiate and/or conduct the automated telephone call, and/or other computational and/or network resources.

In some implementations, one or more of the geolocations can include a geotag of one or more of the digital images and/or position coordinates obtained by a mobile device carried by a user.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for utilizing generative models to identify the contents of an image and/or video. More particularly, but not exclusively, techniques described herein relate to processing image data and/or corresponding contextual data using a generative model to generate output that is unconstrained to a limited vocabulary and reflective of a user's current context, and consequently, provides improved accuracy and detail, particularly in classification of unseen foods and dishes.

Figure 1:
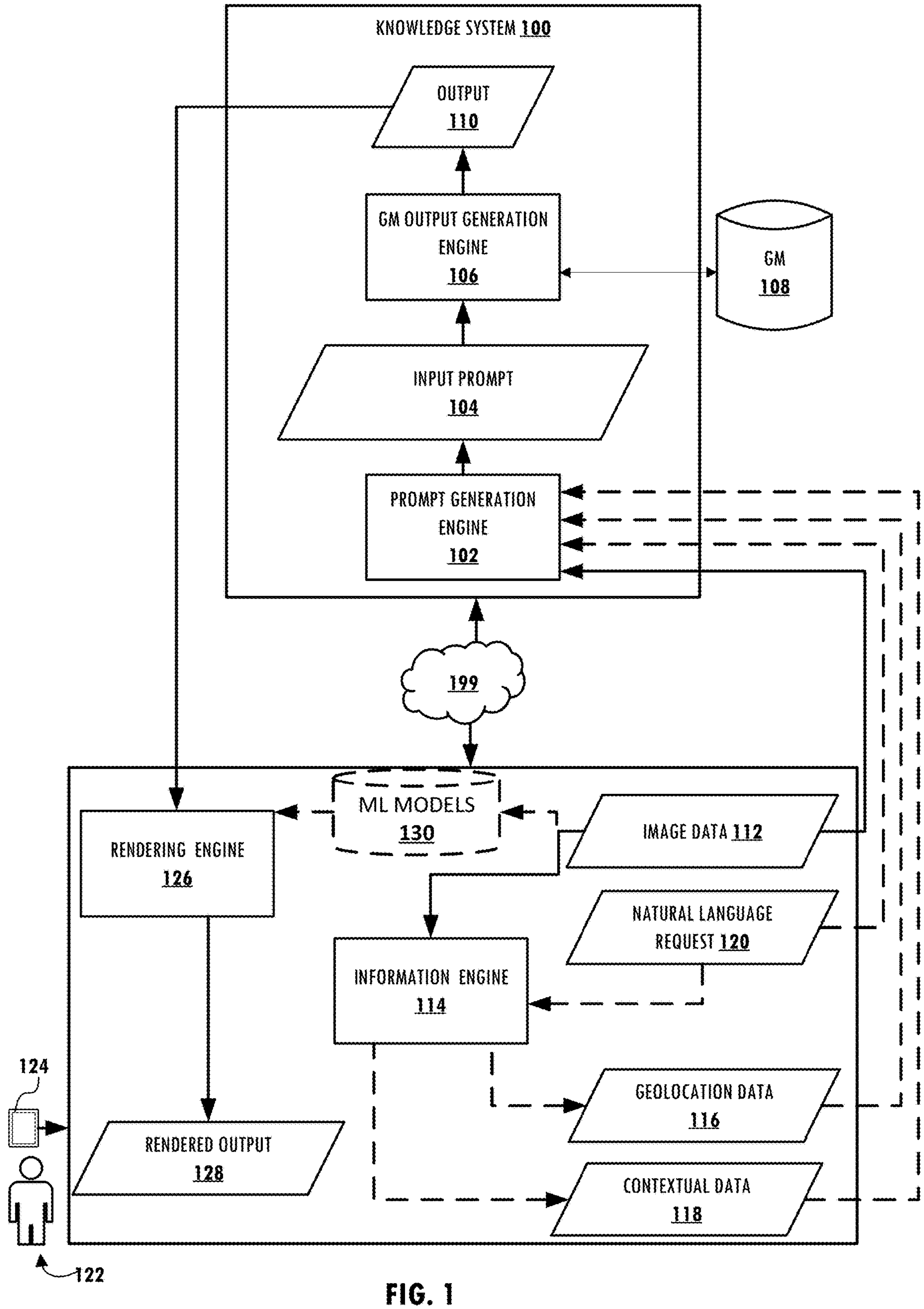
FIG. 1 schematically depicts an example environment in which disclosed techniques may be employed, in accordance with various implementations.

FIG. 1 is a schematic diagram illustrating components that can cooperate to carry out selected aspects of the present disclosure, in accordance with various implementations. The various components depicted in FIG. 1, particularly those components forming a knowledge system 100, may be implemented using any combination of hardware and software. The components of FIG. 1 are depicted as being communicatively coupled with each other via one or more networks 199, which may include one or more of personal area networks, local area networks, or wide area networks (e.g., the Internet). However, this is not meant to be limiting. Various aspects of the present disclosure that are described as being performed by and/or stored on knowledge system 100 can alternatively be performed by and/or stored elsewhere and/or distributed across multiple systems, such as between knowledge system 100 and a client device 124. In various implementations, a user 122 may interact with knowledge system 100 using client device 124.

In some implementations, knowledge system 100 may include one or more computing devices cooperating to perform selected aspects of the present disclosure. In some implementations, knowledge system 100 may include one or more servers forming part of what is often referred to as a "cloud" infrastructure, or simply "the cloud." Alternatively, one or more components of knowledge system 100 may be operated by client device 124.

Knowledge system 100 may include a prompt generation engine 102 and a generative model (GM) output generation engine 106 communicatively coupled with one or more generative models 108. Generative model(s) 108 described herein may take various forms, including, but not limited to, model(s) such as Gemini, Flamingo, PaLM, BERT, LaMDA, Meena, and/or any other single-modal (e.g., large language model or "LLM") or multimodal generative model, such as any other generative model that is encoder-only based, decoder-only based, sequence-to-sequence based and that optionally includes an attention mechanism or other memory, diffusion model(s), etc. Generative models may have hundreds of millions, or even hundreds of billions of parameters. In some implementations, generative models may include multi-modal models such as a vision language model (VLM) and/or a visual question answering (VQA)

model, which can have any of the aforementioned architectures, and which can be used to process multiple modalities of data, particularly images and text, and/or images and audio for example, to generate one or more modalities of output.

In some implementations, one or more of the generative models 108 can be a teacher model while another one or more of the generative models 108 can be a student model. The teacher model can have more parameters than the student model, and oftentimes may be a "foundation" model that is trained on large quantities of data publicly available on the Internet. The teacher model can be used to train the student model, which may have fewer parameters and, upon being trained using the teacher model, may be more narrowly focused on facilitating performance of selected aspects of the present disclosure. Training the student model with the teacher model and using the student model to identify the food items in the image data 112 can reduce the number of computational resources needed to perform a task by reducing the number of parameters that are considered when processing the image data 112 and any other data. In some cases, the student model may be capable of being processed on a resource-constrained device, such as client device 124.

The client device 124 can include an information engine 114 that is used to process image data 112. While depicted as a tablet computer or smart phone in FIG. 1, client device 124 may take other forms, such as a desktop or laptop computer, in-vehicle computing device, augmented reality (AR) and/or virtual reality (VR) headset or glasses, standalone "smart" speakers, etc. The client device 124 can include a rendering engine 126 that can cause rendered output 128 to be rendered via the client device 124.

While shown as separate systems that communicate using network(s) 199, this is not meant to be limiting. Aspects of knowledge system 100 may be implemented in whole or in part on client device 124. If client device 124 includes sufficient computing resources, and/or generative model(s) it uses can be made sufficiently "lean," e.g., by implementing a student model as described above, it may be possible to implement techniques described herein locally on client device 124 to avoid latency introduced by a round trip across network(s) 199. Aspects of the client device 124 can additionally and/or alternatively be implemented in whole or in part by the knowledge system 100.

User 122 may operate client device 124 to interact with knowledge system 100 by providing image data 112 to the prompt generation engine 102. The image data 112 can be any video and/or image data that is accessible to the user 122 via the client device 124. For example, the image data 112 can be a photo and/or video that is captured by user 122 via the client device 124. The image data 112 can be captured, for example, using a camera (not depicted) of the client device 124. Alternatively, the image data can be a screenshot and/or a screen recording that is captured by the client device 124. Alternatively, the image data 112 can be a photo and/or video that the user 122 has downloaded from another source, such as a message or a webpage.

In various implementations, the image data 112 that is provided to the prompt generation engine 102 can be optionally accompanied by one or more of a natural language request 120, geolocation data 116, or other contextual data 118. The image data 112 and/or the natural language request 120 can optionally be applied to the information engine 114. The information engine 114 can process one or both of the image data 112 and the natural language request 120 to generate one or both of corresponding geolocation data 116 and contextual data 118. The image data 112 and one or more of the geolocation data 116, the contextual data 118, or the natural language request 120 can be provided to the prompt generation engine 102.

The prompt generation engine 102 can process the image data 112 and optionally one or more of the natural language request 120, geolocation data 116, or contextual data 118 to generate an input prompt 104. In some implementations, one or more of the image data 112, geolocation data 116, contextual data 118 or the natural language request 120 can be replaced by data indicative thereof, such as embeddings, before being processed by the prompt generation engine 102 to generate the input prompt 104.

The input prompt 104 and/or data indicative thereof may be processed by the GM output generation engine 106 using one or more generative models 108 to generate output 110. Output 110 may take the form of a sequence of tokens representing or otherwise corresponding to textual response and/or other modalities of data, such as images, videos, audio, etc. In various implementations, data indicative of the output 110 may be returned to client device 124 and processed by the rendering engine 126 to generate rendered output 128 that is presented to the user 122 via the client device 124 or a device connected to the client device 124 such as a speaker or display.

Given their large numbers of parameters, generative models 108 can be relatively expensive to apply computationally, and/or may introduce at least some latency. Accordingly, in some implementations, the image data 112 can be processed/preprocessed, e.g., using one or more machine learning models 130, such as a convoluted neural network (CNN), in addition to or in lieu of being processed using one or more of the generative models 108. Determining whether to process the image data 112 with one or more of the machine learning models 130 in addition to or in lieu of one or more of the generative models 108 can be based on the image data 112.

For example, image data 112 may be processed using machine learning model(s) 130 to make a preliminary determination of how many different types of food/ingredients are visible in image data 112. In some implementations, for instance, a CNN or other machine learning model trained to perform image segmentation and/or object recognition may be used to determine a count of how many different objects (e.g., ingredients) are visible in the image, and/or a classification of one or more of those objects. If that count does not satisfy a threshold (e.g., only a single ingredient is depicted), then the classification(s) may be accepted and image data 112 may not be processed using generative model(s) 108. Additionally or alternatively, image segmentation may be performed, e.g., with or without using machine learning, to determine how many distinct objects appear in image data 112. If there's only a single object (e.g., ingredient), one or more of the machine learning models 130 (e.g., a CNN trained for object recognition) can be used to process the image data 112 in lieu of one or more of the generative models 108.

Techniques described herein may be particularly useful when image data 112 is heterogenous and/or "busy," or put another way, has a high level of entropy or chaos. For example, an image depicting an entire table laden with multiple dishes has considerably more detail than a picture of a single apple. Accordingly, in various implementations, a measure of entropy in the image data 112 can be used to determine whether to use one or more of the machine learning models 130 in lieu of or in addition to one or more of the generative models 108. In implementations where the measure of entropy does not satisfy a threshold, one or more of the machine learning models 130 can be used to process the image data in lieu of or in addition to one or more of the generative models 108.

Dynamically determining to utilize one or more of the machine learning models 130 in lieu of one or more of the generative models 108 can save computational resources and improve efficiency. For example, the resources consumed by processors using the machine learning models 130 will be less than the resources consumed by processors using the generative models 108. Utilizing less powerful models to analyze less complex image data 112 improves the efficiency of the system. Latency is also improved when one or more of the machine learning models 130 are local to the client device 124. By preventing extra data from being transmitted via one or more of the networks 199, network resources are conserved and latency is reduced.

Figure 2:
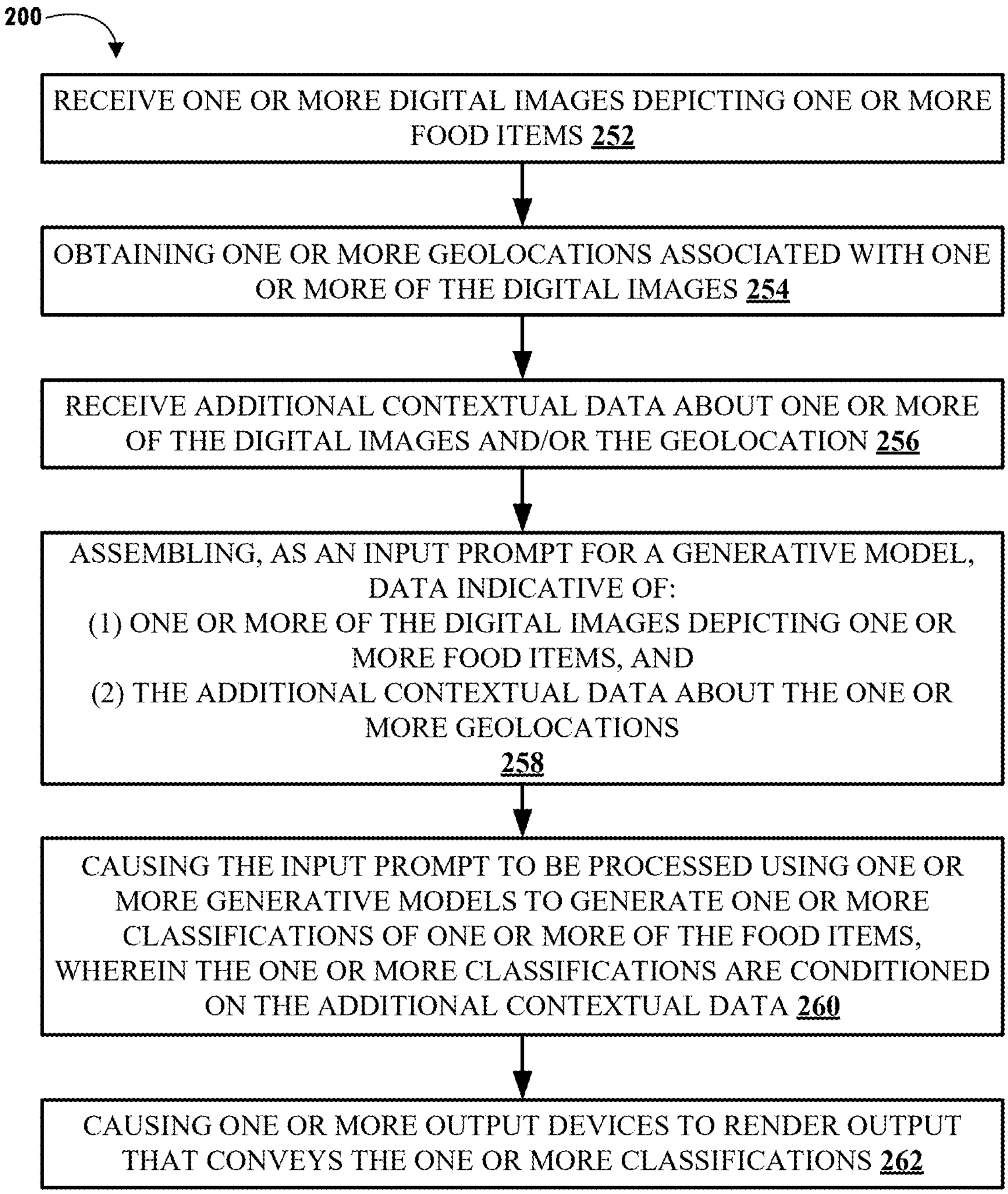
FIG. 2 schematically depicts a flowchart demonstrating an example of how techniques described herein may be carried out.

FIG. 2 depicts a flowchart illustrating an example method of food image recognition using a multimodal generative model in accordance with various implementations. For convenience, the operations of the method 200 are described with reference to a system that performs the operations. The system of method 200 includes at least one processor, memory, and/or other component(s) of computing device(s) (e.g., client device 124 and/or knowledge system 100 of FIG. 1 and/or other computing devices). Moreover, while the operations of the method 200 are shown in a particular order, this is not meant to be limiting. One or more operations may be reordered, omitted, and/or added.

At block 252, the system, e.g., by way of prompt generation engine 102, receives one or more digital images (i.e. image data 112 of FIG. 1) depicting one or more food items. For example, the system can receive the digital image(s) as a result of a user 122 capturing the images with a camera of a client device 124. The one or more digital images may also be received as a result of a user downloading the images from one or more other sources, such as a message thread, web page, camera roll, or any other method a user may use to acquire the digital images. The one or more digital images can include still frames, videos, or any combination therein.

At block 254, the system, e.g., by way of prompt generation engine 102, can obtain one or more geolocations (i.e. geolocation data 116 of FIG. 1) associated with one or more of the digital images. The geolocations associated with one or more of the digital images can be based on a geolocation at which one or more of the digital images were captured. For example, the system can process the metadata associated with one or more of the digital images to determine a geotag associated with one or more of the digital images.

Alternatively and/or additionally, the geolocations associated with one or more of the digital images can be based on a geolocation of a user and/or a user device. For example, the system can utilize the location services on a device to determine a current geolocation of the device and/or the user. In many instances, the user's current position coordinates determined using a Global Positioning System (GPS) sensor may be incorporated into a digital image's metadata as the image's geotag. The system can also determine that the device and/or the user were previously in a particular geolocation, and that that geolocation is associated with one or more of the digital images. For example, it can be determined that a device and/or a user were at a particular geolocation within a threshold period of time, or that one or more of the digital images were captured at a previous time period when the device and/or the user were located at a particular geolocation.

Additionally or alternatively, in some implementations, other data sources may be consulted to determine a location associated with a picture. These other sources may include, for example, a user's electronic calendar (which might indicate the user's location at a particular time), electronic correspondence such as emails and text messages (e.g., a user operates a text messaging application to snap an image and incorporate that image into a multi-participant chat with a message identifying the location (e.g., "I'm at the mall, what's this?")), and so forth.

At block 256, the system, e.g., by way of prompt generation engine 102, can receive additional contextual data 118 about one or more of the digital images and/or the geolocation(s) thereof. In some implementations the system can receive additional contextual data 118 based on the geolocation that is associated with one or more of the digital images such as information about food service entities at or near the geolocation. The additional contextual data 118 can include data indictive of food service entities names, food and drink menus, hours of operation, cuisine types, restaurant classification, pricing, restaurant reviews, calendar information, message data, etc. For example the additional contextual data 118 can include menus from restaurants that satisfy a threshold distance from the geolocation that is associated with one or more of the digital images, and/or menus from the n (positive integer) closest restaurants.

The additional contextual data 118 can also and/or alternatively be contextual data that is independent of the geolocation. For example, the additional contextual data 118 can include a time and/or date that the photo was taken. Contextual data that is independent of the location can be compared to contextual data that is not independent of the location to identify relevant contextual data. For example, a time that the photo was taken can be compared to a geolocation of the photo and/or a list of restaurants that satisfy a threshold proximity to the geolocation in order to determine which of the restaurants the photo was taken at. The time-of-day may also condition the generative model 108 to favor one classifying an image as depicting dish over another. For example, if the image is captured in the morning, the dish may be more likely classified as a breakfast dish from a menu. If the image is captured during the evening, by contrast, the dish may be more likely classified as a dinner dish from the menu.

At block 258, the system, e.g., by way of prompt generation engine 102, can assemble an input prompt 104 for a generative model 108. In some implementations, one or more of the digital images depicting one or more of the food items (or data indicative thereof) can be assembled with one or more of a natural language request 120, geolocation data 116, or contextual data 118 to form an input prompt 104. For example, one or more of the digital images depicting one or more of the food items can be combined with geolocation data 116 to form the input prompt 104. As another example, one or more of the digital images depicting one or more of the food items can be assembled with contextual data 118 indictive of a restaurant menu to form the input prompt 104.

At block 260, the system, e.g., by way of GM output generation engine 106, can cause the input prompt 104 that was assembled at block 258 to be processed using one or more generative models 108 to generate output 110 that includes one or more classifications of one or more of the food items. The output 110 that includes one or more classifications can include one or more of: the names of one or more of the food items, descriptions of one or more of the food items, ingredient lists of one or more of the food items, classification of one or more of the food items by type, or other relevant information about one or more of the food items of the service facility where one or more of the food items are provided. In some cases, the output 110 that includes one or more classifications may be the name of an obscure or “long-tail” dish, e.g., determined by including a menu in the input prompt 104 for the generative model(s) 108.

One or more of the classifications that are generated in block 260 can be conditioned based on one or more of the natural language prompt, geolocation data, and contextual data. For example, in classifying a food item from a particular restaurant, the classification can include the name of the food item as it appears on that particular restaurant's menu. As another example, in classifying a food item, the classification can be pulled only from restaurants that have hours of operation that indicate that the restaurant was open when one or more of the images that depict the food item were obtained.

At block 262, the system, e.g., by way of knowledge system 100 and/or rendering engine 126, can cause one or more output devices to generate rendered output 128 that conveys the one or more classifications of one or more of the food items. The rendered output 128 can be, for example, a textual output that is rendered at a display of a client device 124, an audible output that is rendered via one or more speakers of a client device 124, and/or a haptic output that is rendered via the client device 124.

Figure 3A:
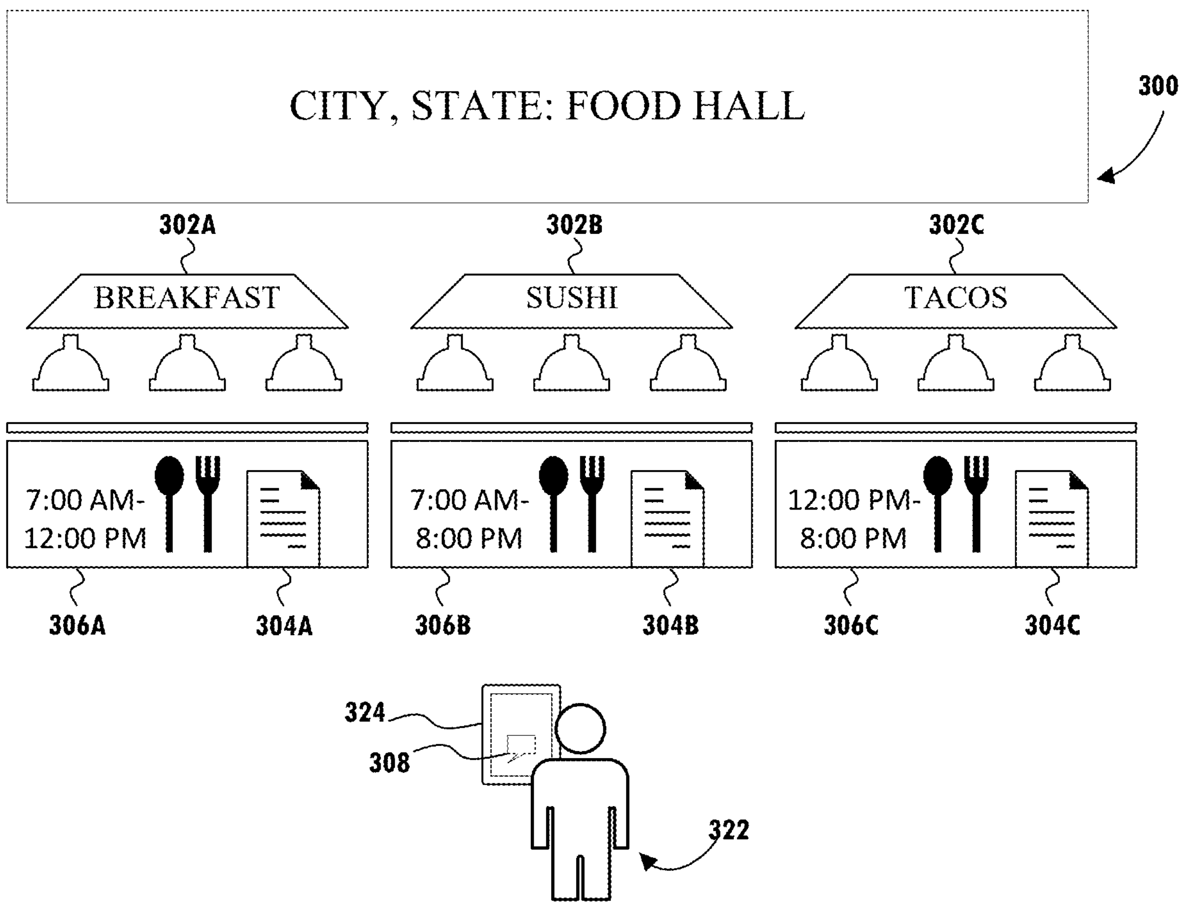
FIGS. 3A and 3B schematically depict an example of how techniques described herein may be implemented, in accordance with various implementations.
Figure 3B:
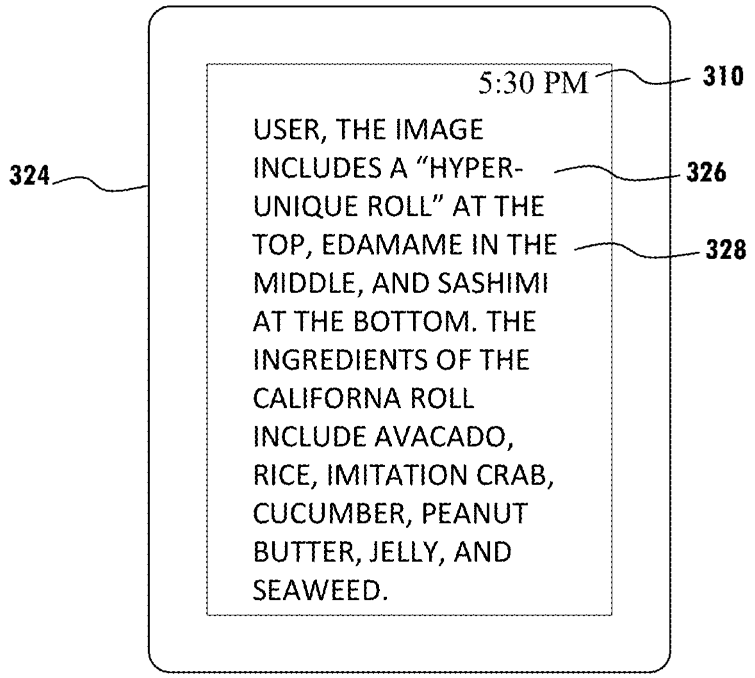

Turning now to FIGS. 3A and 3B, an example scenario in which one or more food items are classified is depicted schematically. For this example scenario, assume a user 322 is visiting a food hall 300 located in “City,” “State.” The food hall 300 can include one or more vendors 302A-C. One or more of the vendors 302A-C can each serve a particular type of cuisine. For example, vendor 302A serves breakfast food, vendor 302B serves sushi, and vendor 302C serves tacos. Each of the vendors can have associated menus 304A-C and/or hours of operation 306A-C.

In some implementations, the user 322 can utilize a client device 324 to capture one or more images and/or videos to classify one or more food items that are present in one or more of the images and/or videos. For example, a user 322 in a food hall 300 can have several different vendors 302A-C to choose from. The user 322 may looking for a particular food item, but the user 322 may be unfamiliar with all the options available at the food hall 300. The user 322 may take images/videos of the different options in order to identify each of them.

In continuation of the previous example, the user 322 may wish to sample a specialized sushi roll from the sushi vendor 302B, but may be unfamiliar with the appearance of various sushi rolls. The user 322 can capture image data of the food at the sushi vendor 302B using a camera of the client device 324. The user 322 can optionally provide a natural language input 308 to accompany the image data. The natural language input can be spoken and transcribed or typed by the user 322.

Geolocation data corresponding to one or more of the images can be obtained. The geolocation data can indicate that the user 322 or the client device 324 were in a particular location when an image was captured. The geolocation data can additionally come from metadata associated with the image, and can indicate the real-world location where the image was captured. For example, when the user 322 captures an image of the sushi vendor's 302B food items, geolocation data indicating that the image was captured in City, State can be obtained.

Still continuing the above example, contextual data corresponding to one or more of the images and/or the geolocation data can be obtained. For example, based on the geolocation data, restaurants near the user 322 can be identified, such as vendors 302A-C. In some implementations, vendors 302A-C can be identified based on the vendors 302A-C proximity to one or more of the user's 322 location, the client device's 324 location, or a location associated with one or more of the images, such as a location where the image was captured, satisfying a threshold proximity measure.

The contextual data can additionally and/or alternatively include information such as menus 304A-C and/or hours of operation 306A-C. For example, the hours of operation 306B for the sushi vendor 302B and the hours of operation 306C of the taco vendor 302C indicate that those two vendors 302B and 302C are operational at the current time 310 (5:30 PM), and therefore the corresponding menus 304B and 304C are currently applicable as contextual data. Similarly, because the user 322 is located in the food hall 300, menus 304A-C from vendors 302A-C located in the food hall can be obtained as contextual data.

After the image data and optionally one or more of the natural language input 308, the geolocation data, or the contextual data have been assembled into the input prompt (104 in FIG. 1), GM output generation engine 106 can process the input prompt 104 and cause rendered output 328 to be presented to the user 322. The rendered output 328 can be presented to the user via the client device 324. The rendered output 328 can be presented audibly via one or more speakers and/or textually via a display 326. Rendered output 328 that is rendered textually via a display 326 of the client device 324 can cause the display 326 to be updated to include a rendering of the textually rendered output 328.

The rendered output 328 can include a description of a classification of one or more of the food items present in one or more of the digital images. For example, an image depicting one or more of the food items at the sushi vendor 302B can result in a rendered output 328 that includes the text “User, the image includes a “Hyper-Unique Roll” at the top, edamame in the middle, and sashimi at the bottom”, where a “hyper-unique roll” is a specialty of vendor 302B that is considered “long-tail” and likely was not learned by generative model(s) 108 during training or fine-tuning. The rendered output 328 can also include additional information that could be relevant to the user 322, such as ingredients. In continuation of the above example, the rendered output can also and/or additionally include a summary of ingredients of one or more of the food items, such as “The ingredients of the Hyper-Specific Roll include avocado, rice, imitation crab, cucumber, peanut butter, jelly, and seaweed.” The rendered output 328 may or may not also include other information, such as geolocation information, hours of operation, cooking details, cultural information, or other details related to one or more of the food items in one or more of the digital images.

In some implementations, the rendered output 328 can include a classification of each of the one or more food items in one or more of the images. Alternatively, the rendered output 328 can include a classification of only a select one or more of the food items. For example, the user 322 can provide a natural language input 308 that includes instructions such as “only identify food items at the top of the image.” As a result, the rendered output 328 can include a statement such as “User, the image includes a Hyper-Specific Roll at the top” that classifies the food item at the top of the image, but does not identify any of the other food items. As another example, the natural language input 308 may include instructions such as "identify the primary food item or dish in the image." This may condition the generative model to pick the dish that is most prominent in the image, e.g., by virtue of being in the center, the largest object in the image, the focal point of the image, etc. Additionally or alternatively, this may condition the generative model to semantically select the "main" course or dish if there are also sides and/or appetizers depicted. As a result, the rendered output 328 may include a statement such as "User, the main dish depicted here is Cacio e pepe."

Figure 4:
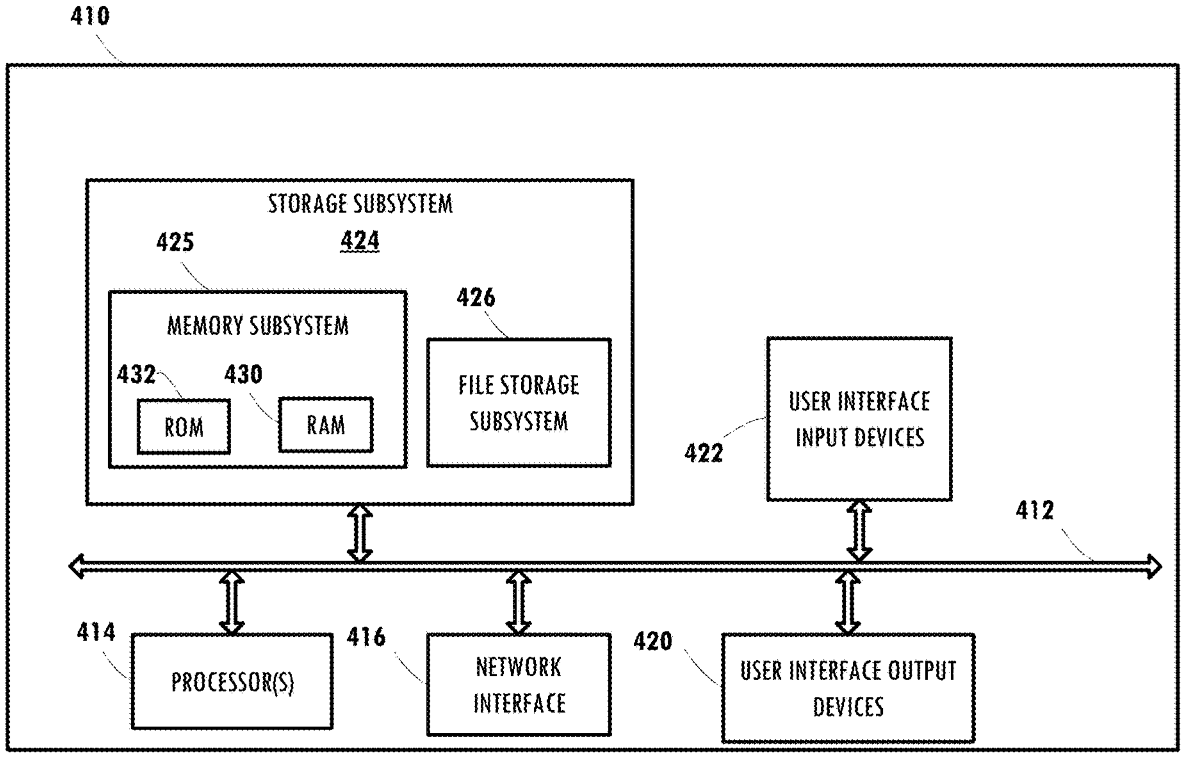
FIG. 4 schematically depicts an example architecture of a computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 624 may include the logic to perform selected aspects of methods 200, and/or to implement one or more aspects of the various components depicted in FIG. 1. Memory 425 used in the storage subsystem 424 can include a number of memories including a main random-access memory (RAM) 430 for storage of instructions and data during program execution and a read only memory (ROM) 432 in which fixed instructions are stored. A file storage subsystem 426 can provide persistent storage for program and data files, and may include a hard disk drive, a CD-ROM drive, an optical drive, or removable media cartridges. Modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple buses.

Computer system 410 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:

receiving one or more digital images depicting one or more food items;

obtaining one or more geolocations associated with one or more of the digital images;

receiving additional contextual data about one or more of the geolocations, wherein the additional contextual data comprises one or more menus of one or more restaurants corresponding to one or more of the geolocations;

assembling, as an input prompt for a generative model, data indicative of:

one or more of the digital images depicting one or more food items, and the additional contextual data about the one or more geolocations;

causing the input prompt to be processed using one or more generative models to generate one or more classifications of one or more of the food items, wherein the one or more classifications are conditioned on the additional contextual data, and wherein a plurality of menu items contained in one or more of the menus define an ad hoc vocabulary of candidate dishes to which the one or more classifications, generated using the one or more generative models, are conditioned; and causing one or more output devices to render output that conveys the one or more classifications.

2. The method of claim 1, wherein the additional contextual data comprises a name of a restaurant at or within a threshold proximity of one or more of the geolocations.

3. The method of claim 1, wherein the additional contextual data comprises a restaurant class or cuisine of a restaurant at or within a threshold proximity of one or more of the geolocations.

4. The method of claim 1, wherein the additional contextual data comprises one or more statements extracted from one or more user reviews of a restaurant at or within a threshold proximity of one or more of the geolocations.

5. The method of claim 1, wherein the additional contextual data comprises one or more price indicators associated with a restaurant at or within a threshold proximity of one or more of the geolocations.

6. The method of claim 1, wherein a plurality of menu items contained in one or more of the menus constrain a search space to which the one or more classifications, generated using the one or more generative models, are limited.

7. The method of claim 1, wherein the input prompt is further assembled to include a command to match one or more of the food items depicted in one or more of the digital images with one or more menu items on one or more of the menus.

8. The method of claim 1, wherein the additional contextual data comprises one or more documents of one or more local dishes of a geographic region corresponding to one or more of the geolocations.

9. The method of claim 1, wherein one or more of the generative models comprises a vision language model (VLM).

10. The method of claim 1, wherein one or more of the generative models comprises a student model that is trained using a teacher model, wherein the student model has fewer parameters than the teacher model.

11. The method of claim 1, wherein one or more of the geolocations comprises a geotag of one or more of the digital images.

12. The method of claim 1, wherein one or more of the geolocations comprises position coordinates obtained by a mobile device carried by a user.

13. A system comprising one or more processors and memory storing instructions that, in response to execution by the one or more processors, cause the one or more processors to:

receive one or more digital images depicting one or more food items;

obtain one or more geolocations associated with one or more of the digital images, wherein the additional contextual data comprises one or more menus of one or more restaurants corresponding to one or more of the geolocations receive additional contextual data about one or more of the geolocations;

assemble, as an input prompt for a generative model, data indicative of:

one or more of the digital images depicting one or more food items, and the additional contextual data about the one or more geolocations;

cause the input prompt to be processed using one or more generative models to generate one or more classifications of one or more of the food items, wherein the one or more classifications are conditioned on the additional contextual data, and wherein a plurality of menu items contained in one or more of the menus define an ad hoc vocabulary of candidate dishes to which the one or more classifications, generated using the one or more generative models, are conditioned; and cause one or more output devices to render output that conveys the one or more classifications.

14. The system of claim 13, wherein the additional contextual data comprises a name of a restaurant at or within a threshold proximity of one or more of the geolocations.

15. The system of claim 13, wherein the additional contextual data comprises a restaurant class or cuisine of a restaurant at or within a threshold proximity of one or more of the geolocations.

16. The system of claim 13, wherein the additional contextual data comprises one or more statements extracted from one or more user reviews of a restaurant at or within a threshold proximity of one or more of the geolocations.

17. The system of claim 13, wherein the additional contextual data comprises one or more price indicators associated with a restaurant at or within a threshold proximity of one or more of the geolocations.

18. At least one non-transitory computer-readable medium comprising instructions that, in response to execution by one or more processors, cause the one or more processors to:

receive one or more digital images depicting one or more food items;

obtain one or more geolocations associated with one or more of the digital images, wherein the additional contextual data comprises one or more menus of one or more restaurants corresponding to one or more of the geolocations;

receive additional contextual data about one or more of the geolocations;

assemble, as an input prompt for a generative model, data indicative of:

one or more of the digital images depicting one or more food items, and the additional contextual data about the one or more geolocations;

cause the input prompt to be processed using one or more generative models to generate one or more classifications of one or more of the food items, wherein the one or more classifications are conditioned on the additional contextual data, and wherein a plurality of menu items contained in one or more of the menus define an ad hoc vocabulary of candidate dishes to which the one or more classifications, generated using the one or more generative models, are conditioned; and cause one or more output devices to render output that conveys the one or more classifications.

* * * * *